(No Model.) 2 Sheets—Sheet 1.
C. G. FAWKES.
MOLD FOR BATTERY PLATES.
No. 567,705. Patented Sept. 15, 1896.
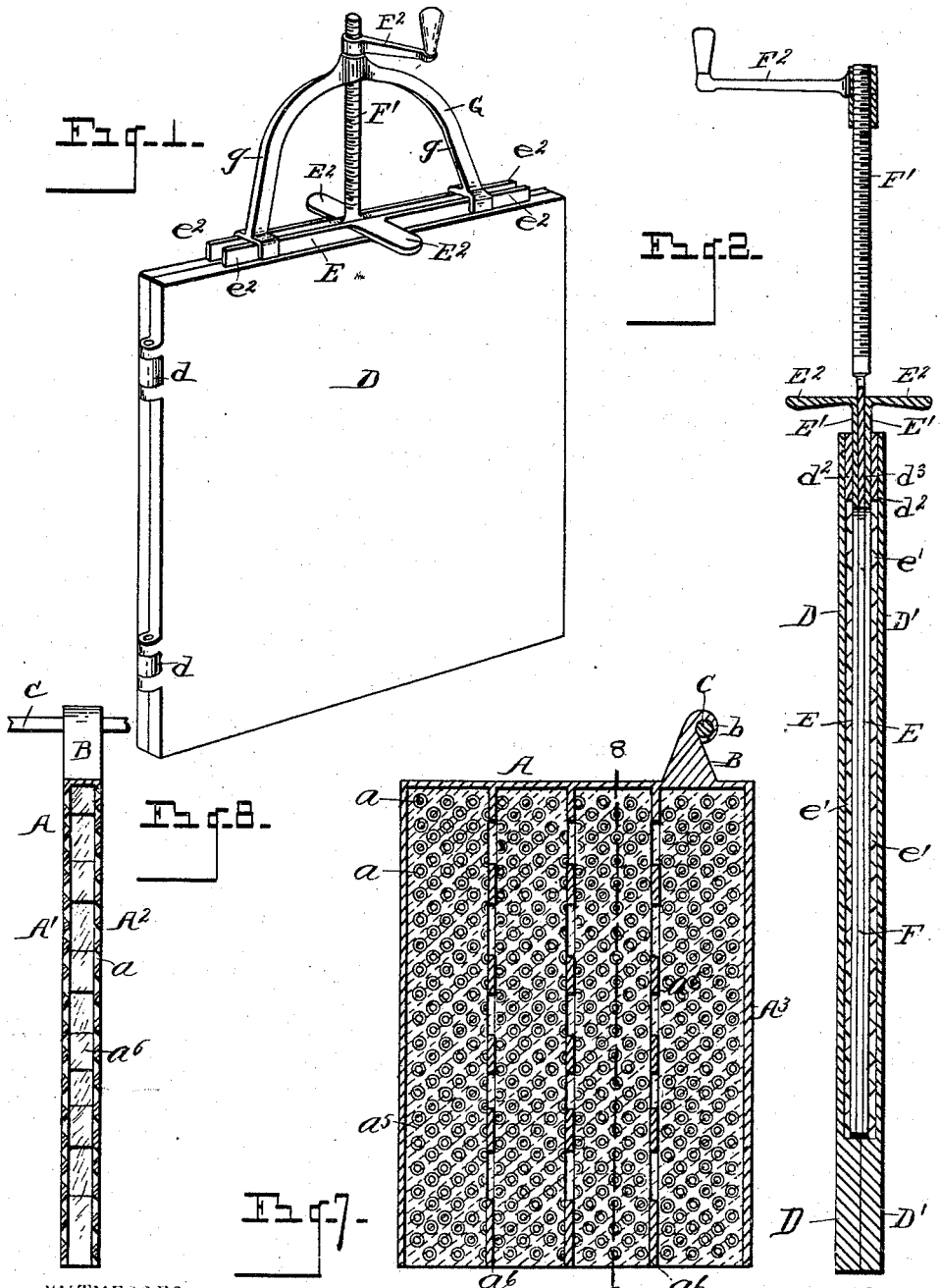
WITNESSES
O. B. Barniger
L. J. Ranney
INVENTOR
Charles G. Fawkes
By his Attorney
Newell S. Wright

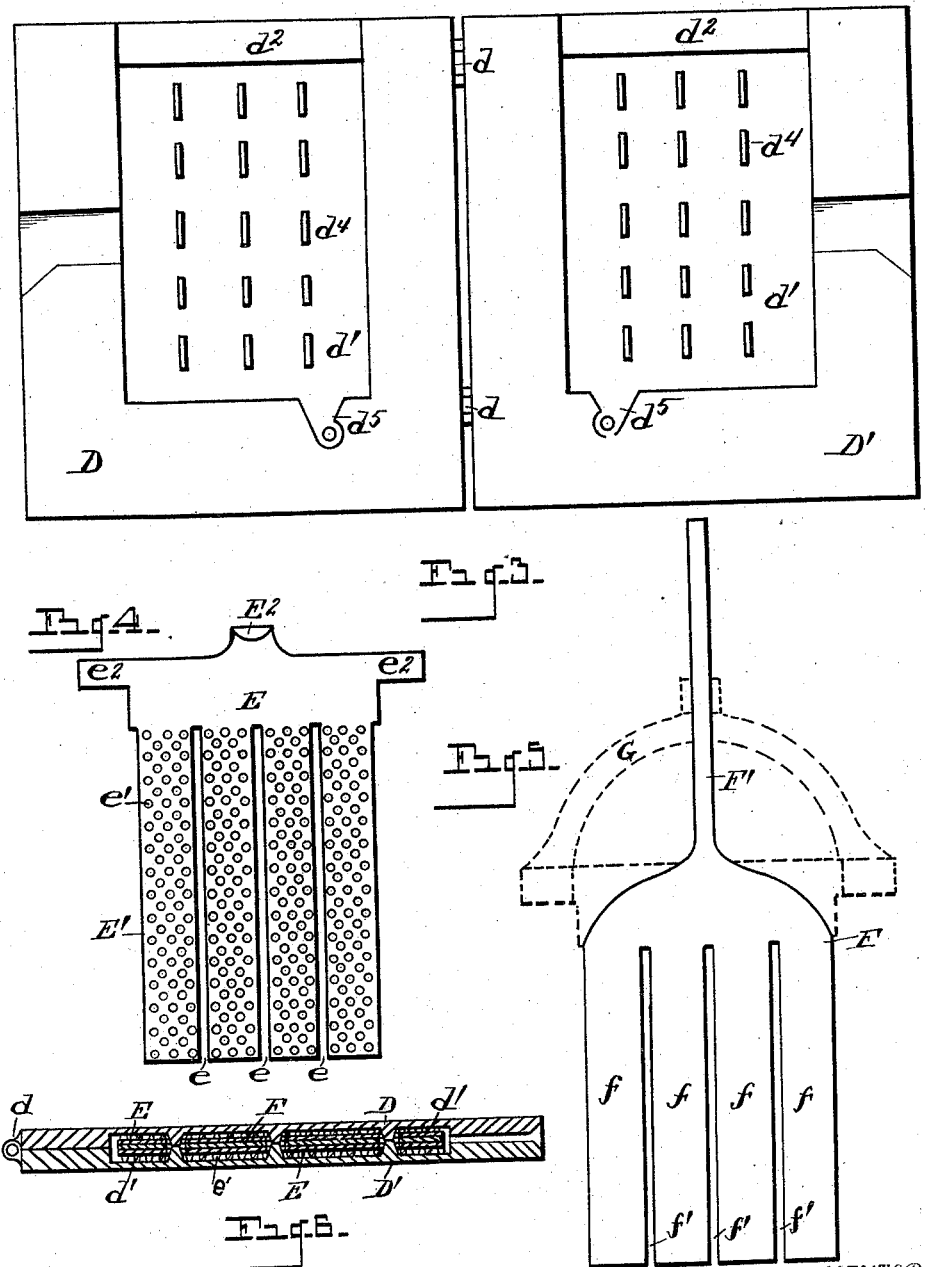

UNITED STATES PATENT OFFICE.

CHARLES G. FAWKES, OF DENVER, COLORADO, ASSIGNOR TO THE FAWKES ELECTRIC MANUFACTURING COMPANY, OF SAME PLACE.

MOLD FOR BATTERY-PLATES.

SPECIFICATION forming part of Letters Patent No. 567,705, dated September 15, 1896.

Application filed August 7, 1895. Serial No. 558,489. (No model.)

*To all whom it may concern:*

Be it known that I, CHARLES G. FAWKES, a citizen of the United States, residing at Denver, county of Arapahoe, State of Colorado, have invented a certain new and useful Improvement in Molds for Battery-Plates; and I declare the following to be a full, clear, and exact description of the invention, such as will enable others skilled in the art to which it appertains to make and use the same, reference being had to the accompanying drawings, which form a part of this specification.

My present invention relates to certain new and useful improvements in a mold for the production of a storage-battery plate, and for the method of manufacturing such a plate thereby, as hereinafter described and claimed, and illustrated in the accompanying drawings, in which—

Figure 1 is a view in perspective of my improved mold, the same being shown in closed position. Fig. 2 is a vertical cross-section thereof. Fig. 3 is a view of the two wings or plates of the mold hinged together, said wings being shown in open position, the cores being removed. Fig. 4 is a view of one of the lateral cores. Fig. 5 is a view of the center core. Fig. 6 is a view in section at right angles to Fig. 2. Fig. 7 is a vertical longitudinal section through one of the battery-plates constructed by the instrumentality of my improved mold. Fig. 8 is a vertical section of the battery-plate on the line 8 8, Fig. 7. Figs. 7 and 8 are shown herewith to more fully illustrate the construction of the mold and the method of constructing the battery-plates thereby.

I will first describe the battery-plate produced by my improved mold, and will then proceed to describe the construction of the mold and the method of its operation in the formation of the battery-plate.

Accordingly A represents one of my improved battery-plates, consisting of lateral walls $A'$ and $A^2$, closed or joined upon three of their edges or sides, as indicated by the sectional margin $A^3$ in Fig. 7. The two walls $A'$ and $A^2$ of the battery-plates are similarly constructed, the construction of said walls, as the wall $A'$, being shown in detail in Fig. 7. Each wall is preferably constructed with a series of openings, preferably circular in form. (Indicated at $a$.) The orifices $a$ may be made flaring on the interior faces of the walls $A'$ $A^2$, as shown in Fig. 8, to more effectually hold the active material. The active material $a^5$ is indicated by the dotted lines in Fig. 7. The space within the walls $A'$ $A^2$ is thus formed hollow throughout in such a manner that the customary paste or active material may be spread throughout said space, so as to give a full and complete connection to the paste throughout on the inside of each battery-plate within the walls $A'$ and $A^2$. At all points within the battery-plate the active material has a full current in all directions throughout the entire interior space of each plate, there being no divisions or resistances whatsoever interposed within said interior to the current throughout said active material. The two walls $A'$ and $A^2$ may, however, if desired, be connected by a series of connecting-lugs. (Shown in section at $a^6$.) In plates of large dimensions their employment will serve to stiffen the plate. The whole body of the paste or active material is thus in electrical connection.

I prefer to construct the plates with supporting terminal lugs B, which may be formed with hooks at their upper ends, as shown at $b$, to engage supporting-bars C to support a series of plates, the plates being made preferably of lead or analogous material. It will be seen that the battery-plate, as thus constructed, is a hollow plate throughout, having the two walls $A'$ $A^2$, the plates of larger size being tied and united together at intervals by the lugs $a^6$. The battery-plates so constructed may be formed in a single integral casting, the perforated walls $A'$ $A^2$, the closed edges upon three sides, and the lugs $a^6$ being all simultaneously formed in one operation of casting the battery-plate. The orifices $a$, it will be seen, are made much larger on the inside of the plate than on the exterior surfaces thereof, thereby effectually preventing the active material from working out of the walls of the battery-plate.

To form the battery-plate above described I employ a mold formed with two wings or leaves D and $D'$, jointedly connected at adjacent edges, as indicated at $d$. Within the margins thereof each of said leaves is countersunk, as indicated at $d'$. The margins about three sides of the two jointedly-connected leaves when folded together contacting respectively, while the upper margin of each plate (indicated at $d^2$) is slightly raised from the surface of the depressed portion $d'$, but leaving still a passage-way between the margins $d^2$ of the two leaves when closed together, as indicated at $d^3$, Fig. 2, through which the cores may be removed. This is readily accomplished by making the marginal edge $d^2$ of each leaf of less thickness than the remaining marginal edges about the depressed or countersunk portion $d'$. Each of the leaves D D' of the mold is provided within the depressed portion $d'$ with lugs $d^4$, which are arranged in vertical rows, as shown.

E indicates a lateral core constructed with longitudinal slots $e$ to receive the corresponding rows of lugs $d^4$ on the leaves of the mold, there being one of these lateral cores for each of the leaves, said cores being similarly constructed, the body of each core being formed to fit into the corresponding countersunk portion $d'$ of the adjacent leaf. Thus in a mold wherein the leaves are each provided with three rows of lugs $d^4$, as indicated in Fig. 3, each of the cores E will be formed with four fingers E', separated by the slots $e$ at their adjacent edges respectively. To form the openings $a$ of the plate, the fingers of each of the cores E are provided with lugs $e'$ facing the inner face of the countersunk portion of the corresponding leaf when in position, the lugs $e'$ being of equal thickness with that of the margin $d^2$ of the corresponding leaf. The opposite face of the core E is made smooth. The upper end of each of the cores E projects through the passage-way $d^3$ in the closed mold, and is preferably provided with shoulders $e^2$ resting upon the upper edge of the leaf when in position.

F denotes a center core constructed with fingers $f$ to correspond with the fingers E' of the lateral cores and with longitudinal slots $f'$ to correspond with the slots $e$ of the lateral cores and for a similar purpose. The core F is made smooth on both its faces and is provided with a projecting stem F' or other suitable device, whereby the core F may readily be withdrawn from the leaves of the mold. As shown, the stem F' is threaded and provided with a hand-nut $F^2$, having a threaded engagement therewith to remove said core. It will be seen that the center core F lies between the lateral cores E and extends through the passage-way or orifice $d^3$ between the margins $d^2$ of the leaves. To remove the center core F, any suitable device may be employed, as, for example, a web G having arms $g$ to rest down upon the outer edges of the cores E or their projecting shoulders $e^2$. The threaded stem F' extends through the web G, and by means of the hand-nut $F^2$, it will be apparent, the center core may be removed from place. I do not limit myself solely to this method of removing the center core, however, as it may be removed in any desired manner within the scope of my invention, When the battery-plate has been cast by pouring the lead or other suitable metal into the mold, it may readily be removed by opening the leaves of the mold. The battery-plate and cores are all removed together from the leaves of the mold, then the center core is pulled out, leaving space for the lateral cores to be removed. It will be apparent that, when the center core is removed, by laying the battery-plate on one side the upper lateral core E may drop down out of normal position into the space primarily occupied by the center core, permitting its ready removal from the plate. By reversing the plate the opposite lateral core E may also drop down out of its normal position into the space primarily occupied by the central core, when it also may be readily removed from the plate. The lateral cores may be formed with handles or flanges $E^2$, if desired, for convenience of their operation.

The recessed portion $d'$ of each leaf is extended, as shown at $d^5$, for the formation of the lugs B on the extremities of the battery-plates. It will be apparent that by means of the web G, resting upon the edges of the lateral cores, the pressure exerted by the withdrawal of the central core will hold the lateral cores in firm position until the center core is removed.

I prefer to heat the center core red-hot before placing it in normal position in the mold by putting into a crucible of hot lead, so that the core will not scale from heating when the metal has been run into the mold.

The lugs $e'$ of the molds E are preferably formed tapering to form the concaved perforations $a$ in the battery-plate.

Obviously when the cores are drawn out of the battery-plate it leaves the center open to receive active material, the battery-plate being thoroughly braced in every direction and connected together. The battery-plate may thus be formed in a single operation in one integral casting. In this manner the plates may be made rapidly and very economically. After the plates have been formed I prefer to put them into a press to press them into any desired thickness, the pressing strengthening the metal and allowing more plates to be placed in a cell of given size, thus affording a much larger quantity of electric current in the cell.

What I claim as my invention is—

1. In a mold for the manufacture of battery-plates, leaves constructed with countersunk portions on the inner faces thereof, and provided with separated lugs arranged in line to form openings in the sides of the battery-plates, combined with a removable core, the parts of which are slotted so as to allow the separated lugs on the two leaves to meet through the slot, substantially as shown.

2. A mold for the manufacture of battery-plates consisting of two leaves, each of which has a countersunk portion on its inner side or face, and a series of lugs arranged in line on each of said faces, combined with a removable core, consisting of three parts, each of which is slotted to receive the lugs and to allow the core to be withdrawn from the mold; the two outer portions of the core being provided with lugs or projections to form openings in the battery-plates substantially as described.

3. A mold for the manufacture of battery-plates, consisting of leaves formed with countersunk portions on their interior faces, and with lugs $d^4$ projecting from the countersunk portion of each leaf, said leaves having in combination therewith slotted lateral cores located in the countersunk portions of the respective leaves, and a slotted center core located between the lateral cores, said center core being first removable from the battery-plate, each of said lateral cores being then successively removable from the plate, substantially as set forth.

4. A mold for the manufacture of battery-plates, provided with leaves having countersunk portions $d'$, and lugs $d^4$ projecting from the countersunk portion of each leaf, and in combination therewith slotted lateral cores provided with lugs $e'$ upon their respective faces adjacent to the corresponding leaves, and a center core made first removable from the plate, said lateral cores being then successively removable from the plate, substantially as set forth.

5. A mold for the manufacture of battery-plates, provided with folding leaves having countersunk portions on their adjacent faces, and an open passage-way $d^3$ at one end of the mold between the leaves, a lateral core situated in the countersunk portion of each leaf, and a center core between the lateral cores, said cores projecting through said passage-way in the mold and made removable as described, each of said lateral cores formed with lugs $e'$, all of said cores provided with longitudinal slots, said leaves each formed with lugs $d^4$ projecting through said slots in said cores, substantially as set forth.

6. A mold for the manufacture of battery-pates, formed with leaves having countersunk portions $d'$ and lugs $d^4$, and with a passage-way $d^3$ between the leaves, and in combination therewith slotted lateral cores located about the lugs $d^4$ within the countersunk portion of the corresponding leaves and a center slotted core located between said lateral cores and projecting about said lugs, and means to remove said cores, substantially as and in the manner described.

In testimony whereof I sign this specification in the presence of two witnesses.

CHARLES G. FAWKES.

Witnesses:
SIDNEY WILLIAMS,
J. M. STAYNER.